United States Patent [19]

Beals et al.

[11] 4,096,501
[45] Jun. 20, 1978

[54] PHOTOGRAPHIC CASSETTE WITH FORWARD CUTOUT PORTIONS TO ELIMINATE LOCALIZED UNWANTED IMAGE AREAS

[75] Inventors: Robert C. Beals, Wilmington; John B. Millard, Cohasset, both of Mass.

[73] Assignee: Polaroid Corporation, Cambridge, Mass.

[21] Appl. No.: 719,809

[22] Filed: Sep. 2, 1976

[51] Int. Cl.² .................. G03B 19/10; G03C 1/48
[52] U.S. Cl. ......................... 354/179; 96/76 C; 96/201; 354/304
[58] Field of Search ............ 354/83, 86, 174, 178, 354/179, 275, 276, 303, 304; 96/76 C, 201

[56] References Cited

U.S. PATENT DOCUMENTS

| | | | |
|---|---|---|---|
| 1,926,469 | 9/1933 | Weider | 354/178 |
| 3,161,122 | 12/1964 | Hamilton | 354/304 |
| 3,737,315 | 6/1973 | Harvey | 96/76 C |
| 3,804,627 | 4/1974 | Harvey | 96/76 C |

FOREIGN PATENT DOCUMENTS 2,456,154  7/1975  Germany ........................ 354/86

*Primary Examiner*—John Gonzales
*Attorney, Agent, or Firm*—Philip G. Kiely

[57] ABSTRACT

Unwanted localized image effects in diffusion transfer photographs are minimized by partially removing portions of the two transverse cassette walls which constrain retained film units against lateral movement.

2 Claims, 3 Drawing Figures

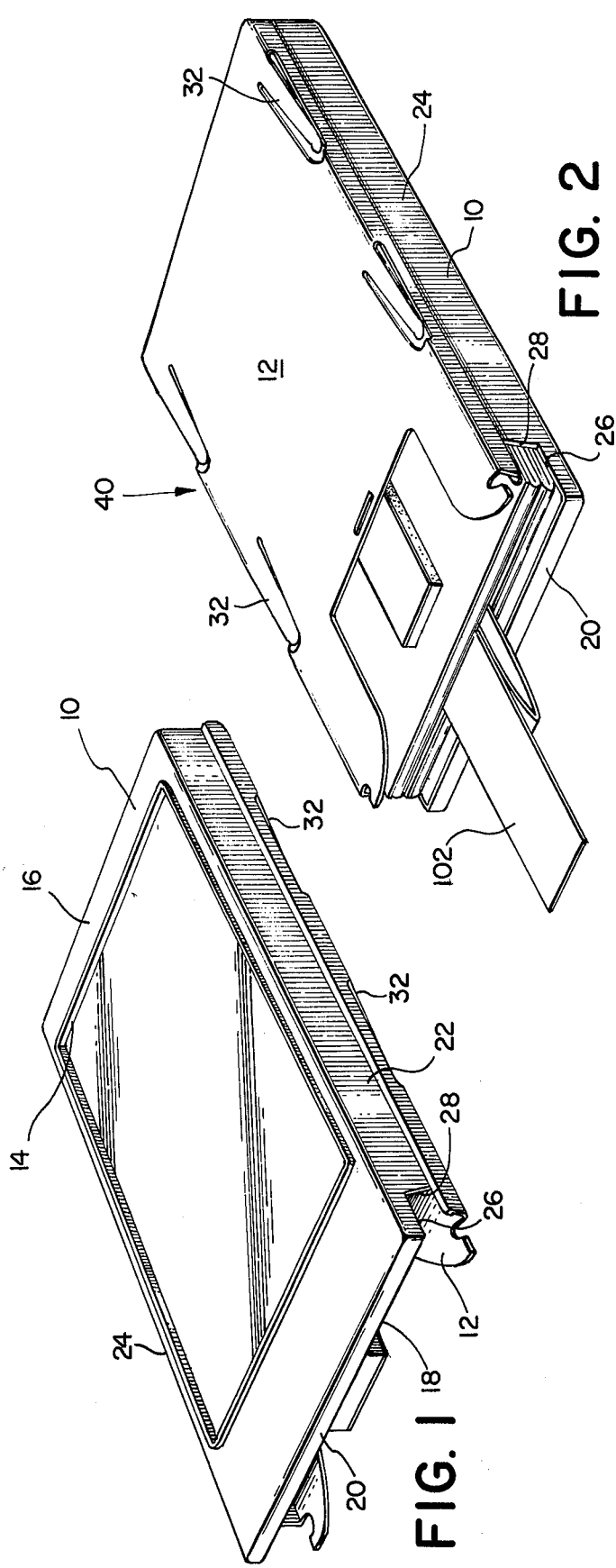
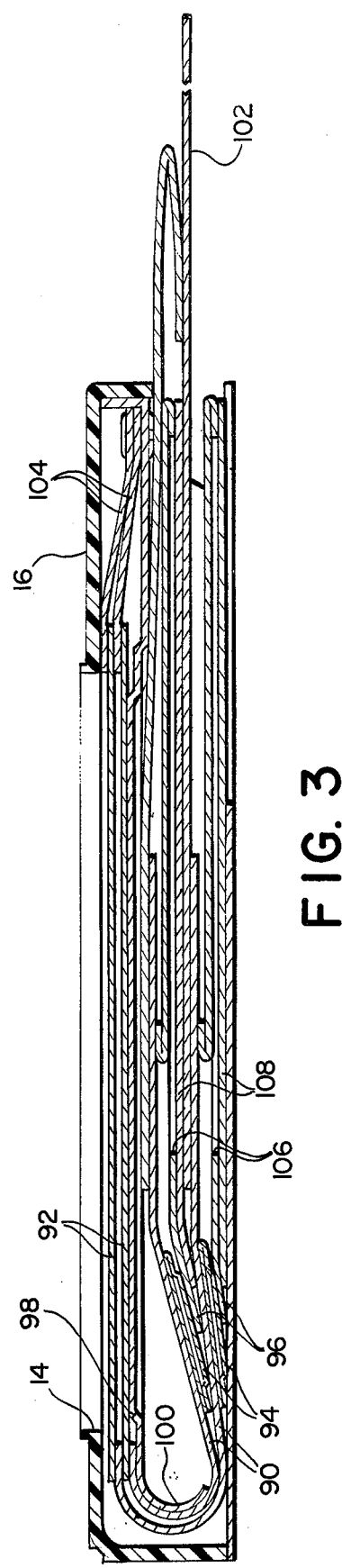

PHOTOGRAPHIC CASSETTE WITH FORWARD CUTOUT PORTIONS TO ELIMINATE LOCALIZED UNWANTED IMAGE AREAS

BACKGROUND OF THE INVENTION

This invention generally relates to photographic film cartridges for use in cameras of the self-developing type, in which photosensitive materials exposed within a camera are developed by a diffusion process upon withdrawal from the camera. It particularly relates to film packages for cameras in which a plurality of multi-layered photographic film units are stored in a flat configuration in a cassette which retains such film units in position to be exposed with a photographic apparatus.

Cassettes which are capable of retaining instant self-developing film units are generally flat elongated containers having an exposure opening in the forward wall through which light from the scene being photographed can be focused and an exit opening formed by the top wall through which a film unit can be withdrawn from the container subsequent to exposure for processing.

Each film unit includes a negative and a positive element in the form of a pair of sheets each of which has a photographic coating on one surface, and the format may be such that the sheets are in superposed relationship with the coatings of each sheet facing in the direction of the exposure opening. In any event, the coating of the sheet which is photosensitive must be oriented toward the opening in the film container. A pressure plate is usually located between the elements to urge the sheet containing the photosensitive coating into a plane that coincides with the focal plane of the camera into which the film package is inserted. Web means interconnect the sheets and are cooperable with the pressure plate so that the sheet containing the image receiving coating can be longitudinally moved relative to the container until it is positioned in registration with and adjacent to the other sheet with the coated surface of each facing the other. In this condition the sheets are in contacting registration, and the introduction of processing liquid between them effects the transfer of image forming materials from the photosensitive coated sheet to the image-receiving sheet. The introduction of such processing liquid takes place when both sheets are longitudinally moved as a unit through the exit opening of the cassette and between a pair of pressure rolls mounted within the casette-containing photographic apparatus. The construction may be such that initial movement of the sheets as a unit fractures a pod holding the processing liquid and attached to the film unit. Upon withdrawal of the unit from the camera, and with concommittant spreading of the processing composition the diffusion of image-forming materials takes place outside the camera.

In certain embodiments of diffusion transfer systems and particularly certain systems which are capable of producing color images rather than black and white images, the film units are extremely gap sensitive; that is, they are very sensitive to variations in the distance maintained between the rollers as processing composition is being spread. Variations in effective gap in localized areas on the rollers, during processing of certain diffusion transfer products which may result from a manipulation of the exiting film unit rather than actual change in gap between the rollers, will provide unwanted chromatic effects in systems where the ultimate chromaticity of the photograph is a major function of the gap maintained between the rollers.

It has been found that with cassettes of the prior art, for example, the cassette shown in FIG. 3 of U.S. Pat. No. 3,479,181, as the photosensitive and image-receiving elements are caused to emerge therefrom, forward portions of the walls which constrain the film units against transverse movement can, in highly gap sensitive situations cause unwanted image areas if the film unit moves slightly transversely in exiting from the camera and an edge of the sandwich butts or rubs against a wall portion of the side walls of the cassette adjacent the exit opening. It is hypothesized that as this butting takes place, at a point somewhat removed from the area which touches the cassette, a change in effective gap is produced which, in a typical color film product will produce a redish orange unwanted spot or "pip". As has been alluded to, this change in effective gap is not due to any actual change in distance between the rollers, but to a bending or deforming of the film unit as it rubs against a cassette side wall when the film unit emerges from the camera. It has been found that by modifying the forward portions of the cassette walls which constrain retained film units against transverse movement by cutting away the portions of the side walls directly adjacent their sections which would ordinarily coincide with the exit opening these unwanted image areas are minimized nearly to the point of being eliminated.

OBJECTS OF THE INVENTION

It is accordingly an object of the present invention to provide a cassette preferably adapted to retain photographic image-receiving elements of the diffusion transfer "peel-apart" variety wherein the walls which constrain such film units against transverse movement have been modified by cutting away a portion thereof immediately adjacent the exit opening.

BRIEF DESCRIPTION OF THE DRAWINGS

For a fuller understanding of the nature and objects of this invention reference should be had to the following detailed description taken in connection with the accompanying drawings wherein:

FIG. 1 is a perspective view of the cassette of the present invention.

FIG. 2 is a bottom view of the cassette of the present invention with retained film units depicted therein; and FIG. 3 is side sectional view through FIG. 2 which shows in general the sequence of image-receiving and photosensitive elements and will be employed to mechanistically describe the manner in which photosensitive film units are removed from the cassette in order to accomplish the objects of the present invention.

DETAILED DESCRIPTION OF THE INVENTION

FIG. 1 depicts the preferred embodiment of the present invention and generally shows a cartridge which comprises a main housing, 10, and a slidable housing closure element 12 which, combined with the main housing, form a structure which is capable of retaining film units and a pressure applying member in stacked relationship. Main housing 10 is generally an elongated body having an exposure opening 14 therein in forward wall 16 through which light from a scene being photographed can be focused. Exit opening 18, through which a film unit can be withdrawn from the container subsequent to exposure, comprises the lower edge of top wall 20 and is generally between side walls 22 and 24. Walls 22 and 24 at essentially the point where they abut top wall 20, each comprise a cutout portion which forms as shown for wall 22, wall edges 26 and 28. Edge 26 is essentially normal to, and edge 28 is essentially parallel to wall 20, though this is not critical. Housing closure element 12 is provided with spring receiving notches 30 into which spring tabs 32 are punched. These tabs have considerable width and project into the interior of housing 10 and into engagement with the top edge of a pressure plate (described below) which is positioned between side walls 22 and 24. Spring tabs 32 urge a negative element engaging portion of the pressure applying member toward the exposure aperture 14. Specific details of cassettes of the type generally described herein may be appreciated by referring to U.S. Pat. No. 3,479,184.

Referring now to FIGS. 2 and 3, a film pack or a sandwich of film units is shown in the cassette which comprises housing 10 and closure element 12. This structure, designated 40 in FIG. 2 is generally parallelepiped shaped for enclosing a plurality of film units. Each film unit is arranged with a photosensitive and second sheets in overlying relation with the photosensitive surface of the photosensitive sheet facing toward exposure aperture 14 and with the surface of the image-receiving sheet which is superposed therewith during processing facing in the same direction. Leader sheet 90 is attached to the photosensitive element 92 at a point intermediate the photosensitive element and associated container of processing composition 94. Carrier sheet 96 is similarly folded adjacent the leading edge of image-receiving element 108 so that portions of the leader sheet and carrier sheet which connect the photosensitive and image-receiving sheets lie therebetween; and the leading and trailing ends of the photosensitive sheet are disposed adjacent respectively the trailing and leading ends of the image receiving sheet. The cassette is further provided with a generally flat rectangular pressure plate 98 which is located intermediate the photosensitive sheet and other portions of the film unit for supporting the photosensitive side of sheet 92 against the inner surface of wall 16 which contains exposure aperture 14. The pressure plate includes a rolled section 100 around which the curved portion of the leader sheet 90 extends. The rolled section 100 is provided for guiding the photosensitive sheet around the end of the pressure plate after exposure in order to mate it with its associated image-receiving element 108 and place it into position for withdrawal from the camera. The major portion of the leader sheet includes the rupturable container 94 and is located behind the pressure plate between it and the image-receiving element 108. The pressure plate is preferably provided with lateral flanges disposed adjacent the side walls of the container to provide guidance for the film units.

The exposure aperture 14 of the cassette is immediately adjacent a photosensitive element 92. A trailer sheet 104 is shown attached to one end of the photosensitive element and, with one end of the carrier sheet 96, provides a trapping mechanism for excess processing fluid. The image-receiving element 108 is attached to a portion of sheet 96 at a point denoted at 106 and provides a mask for defining the image area and cooperating and spreading of processing fluid between the photosensitive and image-receiving elements when they are in superposed processing position. 102 is a forward leader which brings the leader connected to the image-receiving and photosensitive elements into position to cause such elements to be superposed upon exiting from the camera apparatus.

Various and sundry changes in the film units and cassette described are discussed in U.S. Pat. No. 3,161,122 as well as an in depth discussion of the means for withdrawing each film unit from a photographic apparatus. The invention is accordingly not limited to the particular details of construction of the embodiments depicted but contemplates the employment of a cut out forward portion of cassette walls defining the transverse constraining area for retained photographic film units are essentially free to move slightly in a transverse direction without butting against a side wall edge and causing significant changes in effective gap in localized areas between the photosensitive and image-receiving portion of the elements. Depth and width of cut most effective for a given film may be readily determined by routine experimentation. However, satisfactory results with Polaroid Land Type 108 film have been achieved with the side wall edges which restrain transverse movement of the film units during withdrawal, located about one half inch from the top of the cassette, i.e., one half inch from the plane of the top wall which, in conjunction with the side walls, forms the exit opening.

Since certain changes may be made in the above product without departing from the scope of the invention herein involved, it is intended that all matter contained in the above description or shown in the accompanying drawing shall be interpreted as illustrative and not in a limiting sense.

What is claimed is:
1. In a photographic film pack comprising:
   a cassette for retaining diffusion transfer photographic film units in stacked relationship, said cassette comprising a forward wall having a light transmitting aperture therein; two side walls, an edge of each being coincident with respective opposed edges of said forward wall; a generally rectangular top wall, opposed edges of which are coincident with respective edges of said side walls; another edge of said top wall defining, in conjunction with said side walls, a withdrawal opening through which film units may be withdrawn from the cassette; and
   a plurality of diffusion transfer film units in stacked relationship, each of said film units comprising a photosensitive and an image-receiving sheet connected together by a leader, said photosensitive sheet being oriented for exposure through said light transmitting aperture and being associated with a rupturable container retaining a processing composition and means for superposing said photosensitive and image-receiving sheets after exposure of said photosensitive sheet;
   the improvement wherein cut out portions of said side walls define said withdrawal opening with said top wall; said cut out portions comprising opposed edges of said side walls substantially normal to said top wall and edges of said side walls substantially parallel to said top wall and located back from the plane of said top wall; whereby said withdrawal opening comprises the sole exit means for withdrawing exposed film units from said cassette.
2. The cassette of claim 1 wherein said side wall edges are located about one half inch from the plane of said top wall.

* * * * *